(12) United States Patent
Ling

(10) Patent No.: US 9,642,020 B2
(45) Date of Patent: May 2, 2017

(54) STEERABLE MICROWAVE BACKHAUL TRANSCEIVER

(71) Applicant: MaxLinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 427 days.

(21) Appl. No.: 14/249,003

(22) Filed: Apr. 9, 2014

(65) Prior Publication Data

US 2014/0347222 A1 Nov. 27, 2014

Related U.S. Application Data

(60) Provisional application No. 61/809,935, filed on Apr. 9, 2013, provisional application No. 61/881,016, filed on Sep. 23, 2013, provisional application No. 61/884,765, filed on Sep. 30, 2013.

(51) Int. Cl.
| | |
|---|---|
| *H01Q 3/00* | (2006.01) |
| *H04W 16/28* | (2009.01) |
| *H01Q 3/40* | (2006.01) |
| *H04B 1/40* | (2015.01) |
| *H04W 88/08* | (2009.01) |
| *H01Q 25/00* | (2006.01) |
| *H04B 1/10* | (2006.01) |
| *H04B 7/10* | (2017.01) |
| *H04L 1/00* | (2006.01) |

(52) U.S. Cl.
CPC .............. *H04W 16/28* (2013.01); *H01Q 3/40* (2013.01); *H01Q 25/007* (2013.01); *H04B 1/1027* (2013.01); *H04B 1/40* (2013.01); *H04B 7/10* (2013.01); *H04L 1/0091* (2013.01); *H04W 88/08* (2013.01)

(58) Field of Classification Search
CPC .......... H01Q 3/00; H01Q 3/40; H01Q 25/007; H04B 1/01027; H04B 1/40; H04W 16/28; H04W 88/08; H04L 1/0091
USPC ........................................................ 342/373
See application file for complete search history.

(56) References Cited

U.S. PATENT DOCUMENTS

| 4,646,093 A * | 2/1987 | Postema ............. G01S 13/4436 |
| | | 342/151 |
| 4,675,880 A | 6/1987 | Davarian |
| 5,404,222 A * | 4/1995 | Lis ..................... G01B 9/02007 |
| | | 356/487 |

(Continued)

FOREIGN PATENT DOCUMENTS

SE        WO 02061882 A1 *  8/2002 ........... H01Q 3/2658

*Primary Examiner* — Harry Liu
(74) *Attorney, Agent, or Firm* — McAndrews, Held & Malloy, Ltd.

(57) ABSTRACT

A first microwave backhaul transceiver may comprise a reflector and a signal processing subassembly. The signal processing subassembly may comprise a plurality of antenna elements positioned at a focal plane of the reflector. The signal processing subassembly may process a plurality of microwave signals corresponding to the plurality of antenna elements using a corresponding plurality of phase coefficients and a corresponding plurality of amplitude coefficients. The signal processing subassembly may adjust a radiation pattern of the plurality of antenna elements during operation of the signal processing subassembly through adjustment of the phase coefficients and/or the amplitude coefficients.

18 Claims, 12 Drawing Sheets

(56) References Cited

U.S. PATENT DOCUMENTS

| | | |
|---|---|---|
| 6,005,640 A | 12/1999 | Strolle |
| 7,620,112 B2 | 11/2009 | Tang |
| 8,416,836 B2 | 4/2013 | Kirshenbaum |
| 8,989,762 B1 | 3/2015 | Negus |
| 2003/0032424 A1 | 2/2003 | Judd |
| 2005/0136980 A1 | 6/2005 | Kim |
| 2007/0147485 A1 | 6/2007 | Sakamoto |
| 2008/0233879 A1 | 9/2008 | Sasaki |
| 2008/0274732 A1 | 11/2008 | Boutigny |
| 2009/0023462 A1 | 1/2009 | Dent |
| 2009/0207945 A1 | 8/2009 | Sasaki |
| 2010/0240327 A1 | 9/2010 | Lambrecht |
| 2012/0155887 A1 | 6/2012 | Youn |
| 2012/0207048 A1 | 8/2012 | Kim |
| 2013/0089042 A1 | 4/2013 | Negus |
| 2013/0229309 A1 | 9/2013 | Thomas |
| 2014/0031072 A1 | 1/2014 | Koorapaty |
| 2014/0347222 A1 | 11/2014 | Ling |
| 2014/0370936 A1 | 12/2014 | Ling |
| 2015/0188584 A1 | 7/2015 | Laurent-Michel |
| 2015/0215853 A1 | 7/2015 | Ling |
| 2015/0215854 A1 | 7/2015 | Ling |
| 2015/0230105 A1 | 8/2015 | Negus |

\* cited by examiner

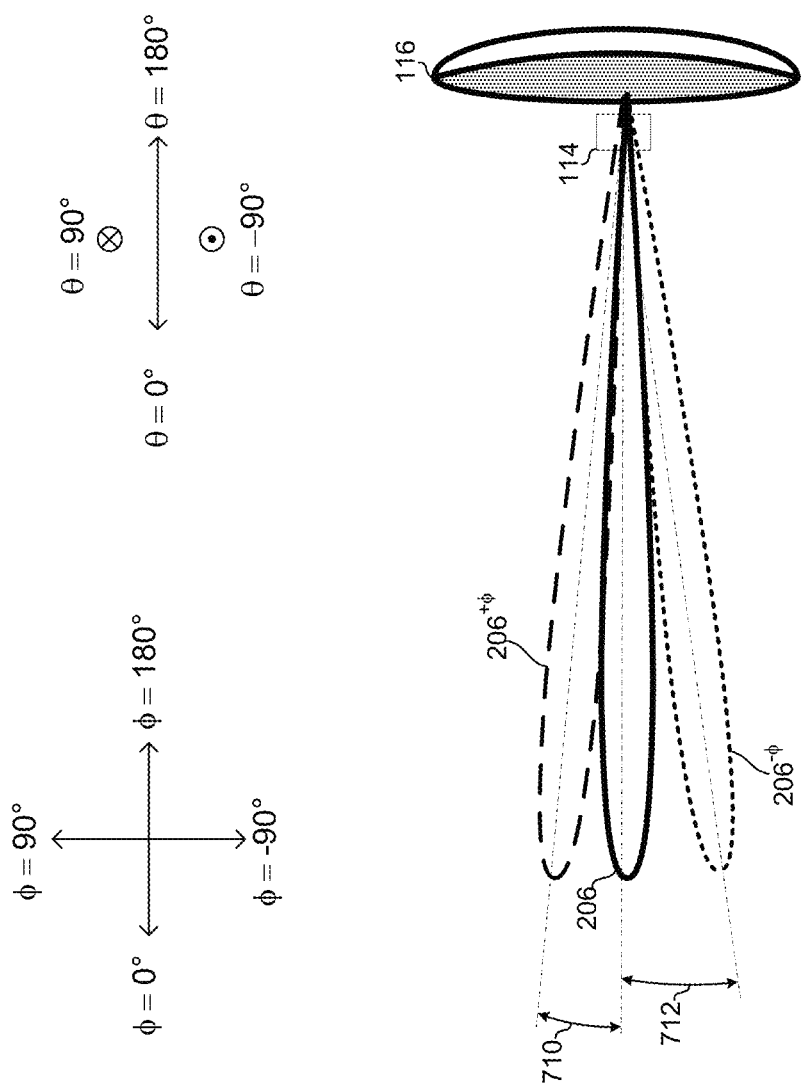

STEERABLE MICROWAVE BACKHAUL TRANSCEIVER

PRIORITY CLAIM

This application claims priority to and the benefit of the following application(s), each of which is hereby incorporated herein by reference:
U.S. provisional patent application 61/809,935 titled "Microwave Backhaul" filed on Apr. 9, 2013;
U.S. provisional patent application 61/881,016 titled "Microwave Backhaul Methods and Systems" filed on Sep. 23, 2013; and
U.S. provisional patent application 61/884,765 titled "Microwave Backhaul Methods and Systems" filed on Sep. 23, 2013.

BACKGROUND

Limitations and disadvantages of conventional approaches to microwave backhaul will become apparent to one of skill in the art, through comparison of such approaches with some aspects of the present method and system set forth in the remainder of this disclosure with reference to the drawings.

BRIEF SUMMARY

Methods and systems are provided for a steerable microwave backhaul transceiver, substantially as illustrated by and/or described in connection with at least one of the figures, as set forth more completely in the claims.

BRIEF DESCRIPTION OF THE DRAWINGS

FIG. 7B shows adjustment of an elevation angle of a lobe of a radiation pattern of a microwave backhaul assembly.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting. As used herein, "microwave" frequencies range from approximately 300 MHz to 300 GHz and "millimeter wave" frequencies range from approximately 30 GHz to 300 GHz. Thus, the "microwave" band includes the "millimeter wave" band.

Figure 1:
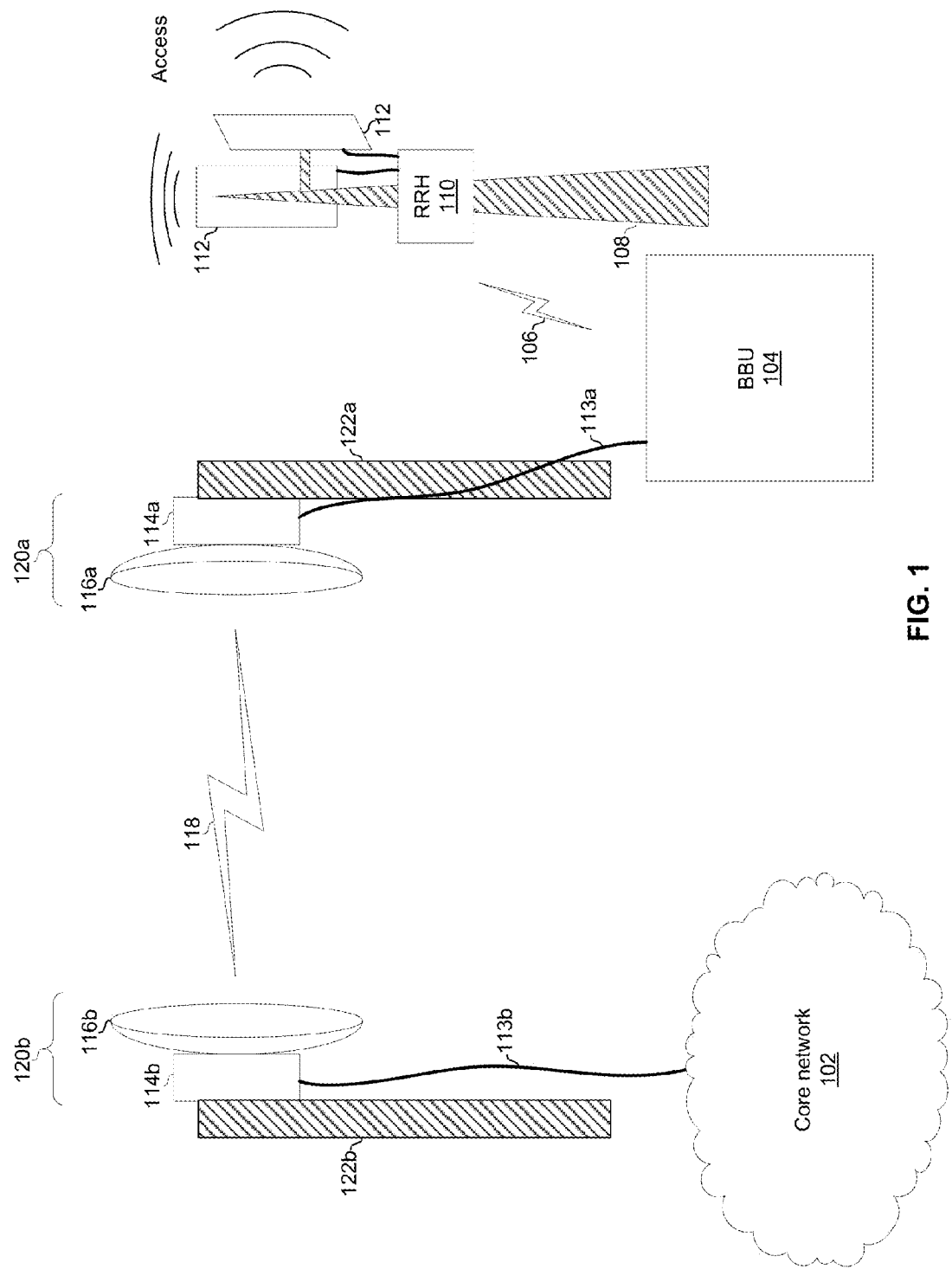
FIG. 1 depicts an example microwave backhaul link between a first microwave backhaul transceiver and a second microwave backhaul transceiver.

FIG. 1 depicts an example microwave backhaul link between a first microwave backhaul transceiver and a second microwave backhaul transceiver. Shown are a tower 108 to which access network antennas 112 and remote radio head (RRH) 110 are attached, a baseband unit 104, a tower 122a to which microwave backhaul transceiver 120a (comprising subassembly 114a and reflector 116a) is attached, and a tower 122b to which microwave backhaul transceiver 120b (comprising subassembly 114b and reflector 116b) is attached. At any particular time, there may be one or more active (i.e., carrying traffic or synchronized and ready to carry traffic after a link setup time that is below a determined threshold) links 106 (shown as wireless, but may be wired or optical) between the RRH 110 and the BBU 104. At any particular time, there may be one or more active backhaul links 118 between the pair of backhaul transceivers 120a and 120b and/or between one of the transceivers 120a and another one or more backhaul transceivers not shown.

The antennas 112 are configured for radiating and capturing signals of an access network (e.g., 3G, 4G LTE, etc. signals to/from mobile handsets). Although the example pair of microwave transceivers 120a and 120b are used for backhauling cellular traffic, this is just one example type of traffic which may be backhauled by microwave transceivers, such as 120a and 120b, that implement aspects of this disclosure.

For an uplink from a mobile handset to the core network 102, the antennas 112 receive signals from the handset and convey them to the RRH 110. The RRH 110 processes (e.g., amplifies, downconverts, digitizes, filters, and/or the like) the signals received from the antennas 112 and transmits the resulting signals (e.g., downconverted I/Q signals) to the baseband unit (BBU) 104 via link(s) 106. The BBU 104 processes, as necessary, (e.g., demodulates, packetizes, modulates, and/or the like) the signals received via link(s) 106 for conveyance to the microwave backhaul transceiver 120a via link 113a (shown as wired or optical, but may be wireless). The microwave backhaul transceiver 120a processes, as necessary (e.g., upconverts, filters, beamforms, and/or the like), the signals from BBU 104 for transmission via the subassembly 114a and reflector 116a over microwave backhaul link(s) 118. The microwave transceiver 120b receives the microwave signals over microwave backhaul link(s) 118 via the subassembly 114b and reflector 116b, processes the signals as necessary (e.g., downconverts, filters, beamforms, and/or the like) for conveyance to the cellular service provider core network 102 via link 113b.

For a downlink from the core network 102 to the mobile handset, data from the core network 102 is conveyed to microwave backhaul transceiver 120b via link 113b. The transceiver 120b processes, as necessary (e.g., upconverts, filters, beamforms, and/or the like), the signals from the core network 102 for transmission via the subassembly 114b and reflector 116b over link(s) 118. Microwave transceiver 120a receives the microwave signals over the microwave backhaul link(s) 118 via the subassembly 114a and reflector 116a, and processes the signals as necessary (e.g., downconverts, filters, beamforms, and/or the like) for conveyance to the BBU 104 via link 113a. The BBU 104 processes the signal from transceiver 120a as necessary (e.g., demodulates, packetizes, modulates, and/or the like) for conveyance to RRH 110 via link(s) 106. The RRH 110 processes, as necessary (e.g., upconverts, filters, amplifies, and/or the like), signals received via link 106 for transmission via an antenna 112.

Figure 2:
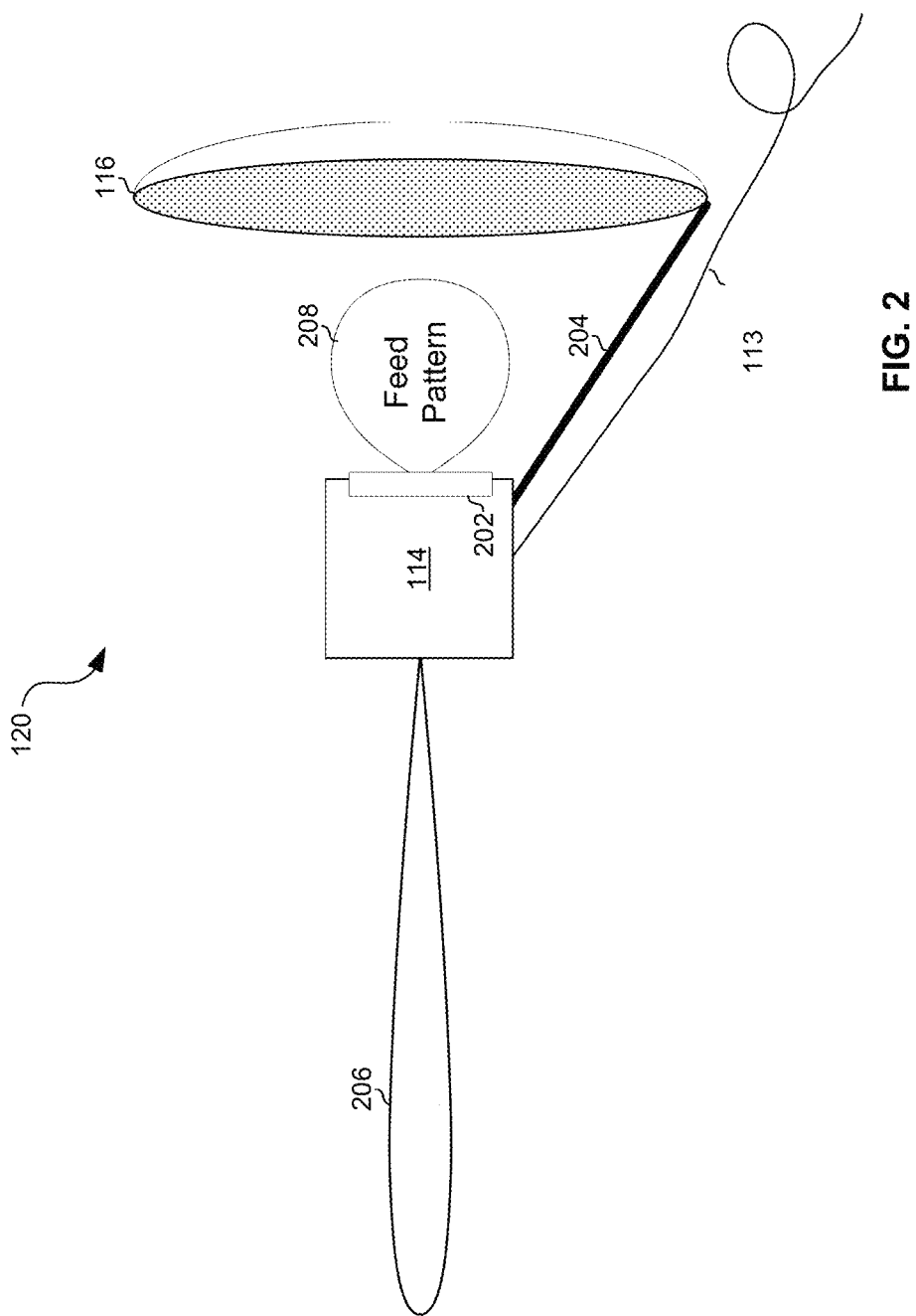
FIG. 2 shows an example implementation of a steerable microwave backhaul transceiver.

FIG. 2 shows an example implementation of a steerable microwave backhaul transceiver. The depicted transceiver 120 represents each of the transceivers 120a and 120b described above with reference to FIG. 1. The example transceiver 120 comprises the subassembly 114 mounted to a support structure 204 (which may, in turn, mount the assembly to the mast/tower 122, building, or other structure, not shown in FIG. 2), and a link 113 which represents each of the links 113a and 113b. The subassembly 202 comprises an antenna array 202 which in turn comprises a plurality of antenna elements. The subassembly 202 may be mounted such that the antenna elements are positioned at or near a focal plane of the reflector 116. The subassembly may comprise, for example, one or more semiconductor dies ("chips") arranged on one or more printed circuit boards. The antenna elements may be, for example, horns and/or microstrip patches. In the example implementation depicted, the antenna elements capture signals reflected by reflector 116 for reception and bounce signals off the reflector 116 for transmission. In another implementation, the antenna elements may directly receive backhaul signals, or receive them through a lens, for example. The radiation pattern 208 of the antenna array 202 corresponds to a radiation pattern 206 after reflection off the reflector 116 (Although the radiation patterns may comprise multiple lobes, only a main lobe is shown for simplicity of illustration).

Figure 3:
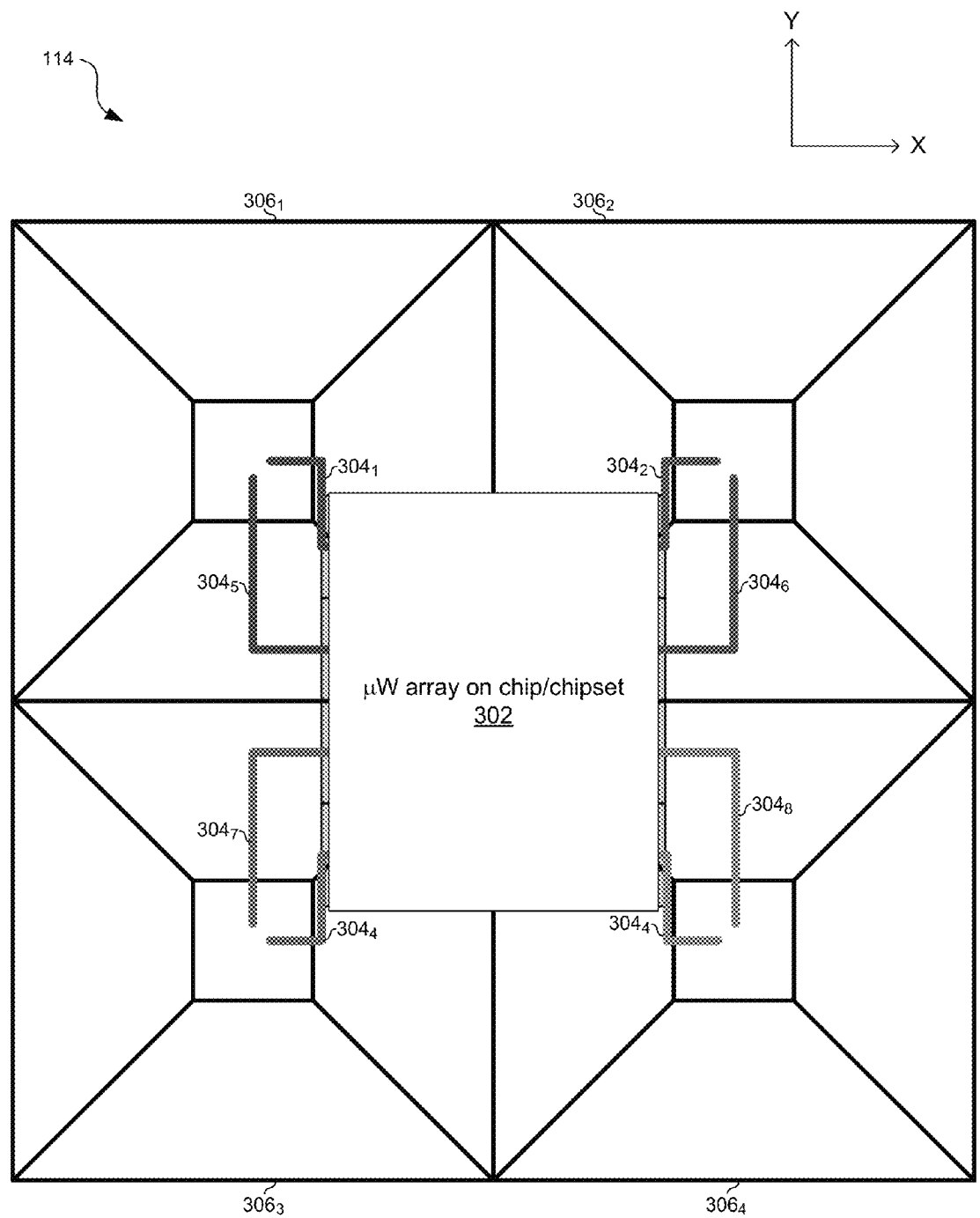
FIG. 3 shows an example implementation of the subassembly of FIG. 2.

FIG. 3 shows an example implementation of the subassembly of FIG. 2. The example subassembly 114 comprises four feed horns $306_1$-$306_4$, and circuitry (e.g., a chip or chipset) 302. The circuitry 302 drives signals to the horns $306_1$-$306_4$ via one or more of feed lines $304_1$-$304_8$ for transmission and receives signals from the horns $306_1$-$306_4$ via feed lines $304_1$-$304_8$ for reception. The circuitry 302 is operable to control the phases and/or amplitudes of signals output to the feed lines $304_1$-$304_8$ so as to achieve desired transmit radiation patterns. Similarly, the circuitry 302 is operable to control the phases and/or amplitudes of signals received from the feed lines $304_1$-$304_8$ so as to achieve desired receive radiation patterns.

The feed lines $304_1$-$304_4$ correspond to a first polarization and the feed lines $304_5$-$304_8$ correspond to a second polarization. Accordingly, the subassembly 114 may be operable to concurrently receive two different signals on the same frequency but having different polarizations, concurrently transmit two different signals on the same frequency but having different polarizations, and/or concurrently transmit a first signal having a first polarization and receive a second signal having a second polarization. Furthermore, the radiation pattern for the two polarizations may be controlled independently of one another. That is two independent sets of amplitude and phase beamforming coefficients may be maintained by circuitry 302, with the first set used for feed lines $304_1$-$304_4$ and the second set used for feed lines $304_5$-$304_8$.

Figure 4A:
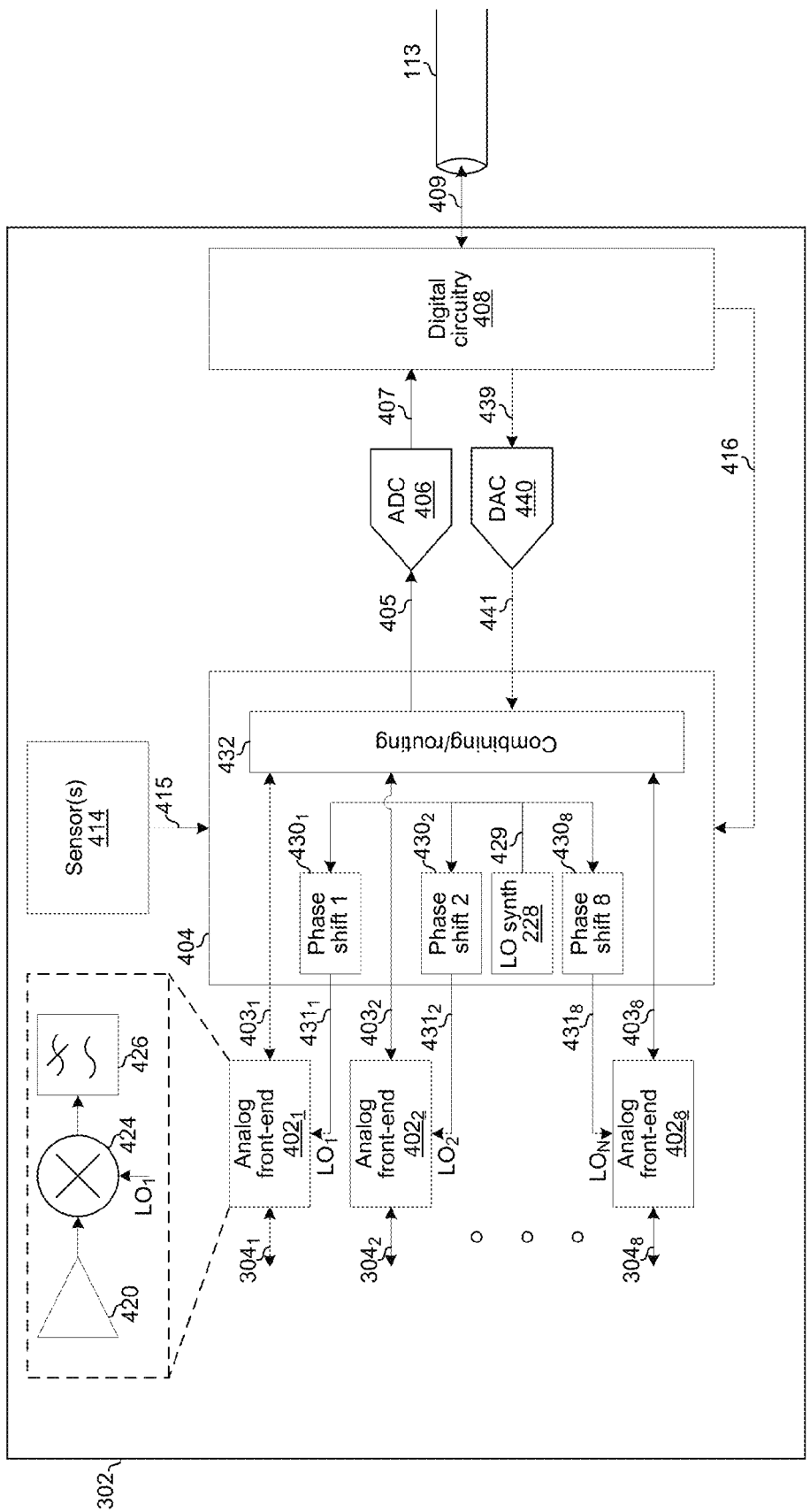
FIG. 4A shows a first example implementation of the circuitry of FIG. 3.

FIG. 4A shows a first example implementation of the circuitry of FIG. 3. In the example implementation shown, the circuitry 302 comprises analog front-ends $402_1$-$402_8$, a beamforming circuit 404, analog-to-digital converter (ADC) 406, one or more sensors 414, digital circuitry 408, and a digital to analog converter (DAC) 440. The circuitry 302 outputs received data onto the link 113 (e.g., coaxial cable) and receives to-be-transmitted data via link 113.

The sensor(s) 414 may comprise, for example, a gyroscope, an accelerometer, a compass, a GPS receiver, and/or the like. Accordingly, the sensor(s) 114 may be operable to determine movement, orientation, geographic position, and/or other physical characteristics of the transceiver 120. The sensor(s) 114 may comprise, for example, a hygrometer, a psychrometer, and/or a radiometer. Accordingly, the sensor(s) 114 may be operable to determine atmospheric conditions and/or other physical obstructions between the transceiver 120 and potential link microwave backhaul link partners. The sensor(s) 414 may output readings/measurements as signal 415.

For receive operations, each front-end circuit $402_n$ (1≤n≤N, where N=8 in the example implementation depicted) is operable to receive a microwave signal via feed line $304_n$. The front-end circuit $402_n$ processes the signal on feed line $304_n$ by, for example, amplifying it via a low noise amplifier LNA $420_n$, filtering it via filter $426_n$, and/or downconverting it via mixer $424_n$ to an intermediate frequency or to baseband. The local oscillator signal $431_n$ for the downconverting may be generated by the circuit 404, as described below. The result of the processing performed by each front-end circuit $402_n$ is a signal $403_n$.

The beamforming circuit 404 comprises local oscillator synthesizer 228 operable to generate a reference local oscillator signal 429, and comprises phase shift circuits $430_1$-$430_N$ operable to generate N phase shifted versions of signal 429, which are output as signals $431_1$-$431_N$. The amount of phase shift introduced by each of the circuits $430_1$-$430_N$ may be determined by a corresponding one of a plurality phase coefficients. The plurality of phase coefficients may be controlled to achieve a desired radiation pattern of the antenna elements $306_1$-$306_4$. In another example implementation, additional front-end circuits 402 and phase shifters 430 may be present to enable concurrent reception of additional signals via the antenna elements $306_1$-$306_N$.

The beamforming circuit 404 also comprises a circuit 432 which is operable to perform weighting of the signals $403_1$-$403_8$ by their respective amplitude coefficients determined for a desired radiation pattern. For reception, the circuit 432 is operable to combine the weighted signals prior to outputting them on signal 405. The circuit 404 may also be operable to dynamically control interconnections between signals $403_1$-$403_8$ and signals 405 and 441 to support different configurations such as the full-duplex configuration as shown in FIG. 5A (e.g., transmit and receive on different frequencies or different polarizations of the same frequency), the configuration of FIG. 5B for concurrent transmission of two different signals (e.g., transmit on two frequencies or two polarizations of the same frequency), and the configuration of FIG. 5C for concurrent reception of two different signals (e.g., receive on two frequencies or two polarizations of the same frequency).

In an example implementation, the phase and/or amplitude coefficients may be controlled/provided by the digital circuitry 408 via signal 416. The phase and amplitude coefficients may be adjusted dynamically. That is, the coefficients may be adjusted while maintaining one or more active backhaul links.

Dynamically adjusting the phase and/or amplitude coefficients during reception of energy of microwave backhaul signals results in corresponding changes in the radiation pattern of the transceiver 120. Different patterns may capture different amounts of energy from different microwave backhaul signals. By adjusting the radiation pattern intelligently, sufficient energy from multiple beams may be captured during a single time interval such that content carried in each of the beams during that time interval can be demodulated and decoded with less than a threshold amount of errors. In other words, the "scanning" may effectively enable "illuminating" more of the reflector 116 than could a single antenna element having the same dimensions as the overall dimensions of the array of antenna elements 306. As an example to illustrate, for a first radiation pattern (i.e., first set of phase and amplitude coefficients), energy received from a first microwave backhaul signal may be above a threshold, but energy received from a second microwave backhaul signal may be below the threshold. Conversely, for a second radiation pattern, power received from the first microwave backhaul signal may be below the threshold, but power received from the second microwave backhaul signal may be above the threshold. Accordingly, by dwelling on each of the two radiation patterns for a sufficient percentage of a sufficiently short time interval, sufficient energy may be captured for each of the microwave backhaul signals during that time interval such that the information on both microwave backhaul signals during that time interval can be recovered.

In an example implementation, the phase and/or amplitude beamforming coefficients may be controlled based on measured performance metrics of one or more backhaul links 118. For example, the digital circuitry 408 may continuously, or periodically, monitor a signal-to-noise ratio of a link 118 and may continuously, or periodically, adjust the coefficients (and thus the radiation pattern) in an attempt to maximize the signal-to-noise ratio. This may improve performance in the presence of dynamic misalignment (e.g., due to twist and sway cause by wind and/or wherein one or both of the microwave backhaul assemblies is mobile) and/or static misalignment (e.g., misalignment that resulted from less-than-perfect installation of the transceiver 120.)

In an example implementation, the sensor(s) 414 may perform a compass function and may indicate an orientation of the transceiver 120. The phase and/or amplitude beamforming coefficients (and thus the radiation pattern) may then be continuously or periodically adjusted based on the indicated orientation. This may improve performance of the backhaul link 118 in the presence of dynamic misalignment (e.g., due to twist and sway cause by wind and/or wherein one or both of the microwave backhaul assemblies is mobile) and/or static misalignment (e.g., misalignment that resulted from less-than-perfect installation of the transceiver 120.)

In an example implementation, the sensor(s) 414 may indicate movement of the transceiver 120. The phase and/or amplitude beamforming coefficients (and thus the radiation pattern) may then be continuously or periodically adjusted based on the indicated movement. This may improve performance of the backhaul link 118 in the presence of dynamic misalignment (e.g., due to twist and sway cause by wind and/or wherein one or both of the microwave backhaul assemblies is mobile).

In an example implementation, the sensor(s) 414 may indicate atmospheric conditions through which microwave backhaul signals to and/or from the transceiver 120 may travel. The phase and/or amplitude beamforming coefficients (and thus the radiation pattern) may then be continuously or periodically adjusted based on the atmospheric conditions. This may improve performance of individual backhaul links 118, and/or of the network as a whole, in the presence of rain, snow, fog, smog, or other atmospheric conditions which negatively impact microwave communications.

In an example implementation, the phase and/or amplitude beamforming coefficients may be controlled based on data retrieved from a local and/or networked database. Such data may include, for example, data indicating geographical locations of other microwave backhaul assemblies with which the transceiver 120 may desire to establish a microwave backhaul link, and/or data indicating atmospheric conditions which may impact microwave communications.

The ADC 406 is operable to digitize signal 405 to generate signal 407. The bandwidth of the ADC 406 may be sufficient such that it can concurrently digitize entire microwave backhaul bands comprising a plurality of channels or sub-bands (e.g., the ADC 406 may have a bandwidth of 1 GHz or more).

The DAC 440 is operable to convert digital signal 439 (e.g., a digital baseband signal) to an analog signal 441.

For receive, the digital circuitry 408 is operable to process the digital signals 407 for output to link 113. The processing may include, for example, interference (e.g., cross-polarization interference) cancellation. The processing may include, for example, channelization to select, for output to the link 113, sub-bands or channels of the signal 407. The processing may include, for example, band stacking, channel stacking, band translation, and/or channel translation to increase utilization of the available bandwidth on the link 113.

For transmit, the digital circuitry 408 is operable to perform digital baseband processing for preparing data received via link 113 to be transmitted via the microwave backhaul link(s) 118. Such processing may include, for example, processing of packets received via the link 113 to recover the payload data from such packets, and then packetization, modulation, etc. to generate a microwave backhaul digital baseband signal 439 carrying the payload data.

The implementation of circuitry 302 shown in FIG. 4A may be realized on any combination of one or more semiconductor (e.g., Silicon, GaAs) dies and/or one or more printed circuit board. For example, each front-end circuit $402_n$ may comprise one or more first semiconductor dies located as close as possible to (e.g., a few centimeters from) its respective antenna element $306_N$, the circuits 404 and 406 may comprise one or more second semiconductor dies on the same PCB as the first die(s), the circuits 408 and 440 may reside on one or more third semiconductor dies on the same PCB, and the sensor(s) 414 may be discrete components connected to the PCB via wires or wirelessly.

Figure 4B:
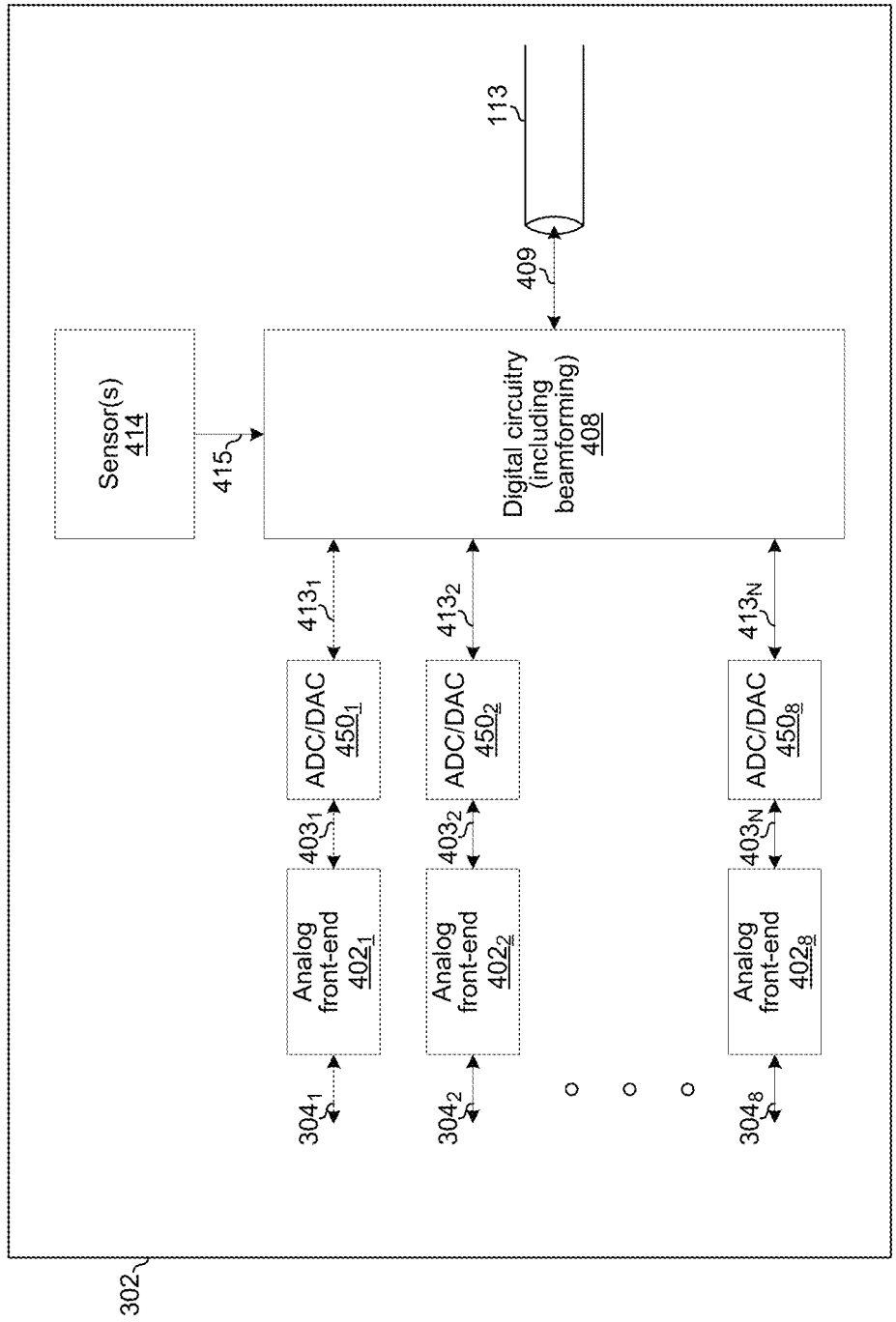
FIG. 4B shows a second example implementation of the circuitry of FIG. 3.

FIG. 4B depicts a second example implementation of the circuitry 302. In this example implementation, the application of beamforming amplitude and phase coefficients is performed in the digital domain in digital circuitry 408. That is, in addition to other functions performed by digital circuitry 408 (such as those described above), the digital circuitry may also perform phase and amplitude weighting and combining of the signals $413_1$-$413_8$.

Each of the circuits $450_1$-$450_8$ is operable to perform digital-to-analog conversion (when used for transmission) and/or analog-to-digital conversion (when used for reception). In this regard, for reception, the signals $413_1$-$413_8$ are the result of digitization of the signals $403_1$-$403_8$ output by the front-ends $402_1$-$402_8$. For transmission, the signals $413_1$-$413_8$ are the result of digital circuitry 408 performing phase and amplitude weighting and combining of one or more digital baseband signals (the weighting and combining may be as described in one of FIGS. 6A-6C).

The implementation of circuitry 302 shown in FIG. 4B may be realized on any combination of one or more semiconductor (e.g., Silicon, GaAs) dies and/or one or more printed circuit board. For example, each pair of $402_n$ and $450_n$ may comprise an instance of a first semiconductor die and may be located as close as possible to (e.g., a few centimeters from) its respect antenna element $306_n$, the digital circuitry 408 may comprise an instance of a second semiconductor die on the same PCB as the first dies, and the sensor(s) 414 may be discrete components connected to the PCB via wires or wirelessly.

Figure 8:
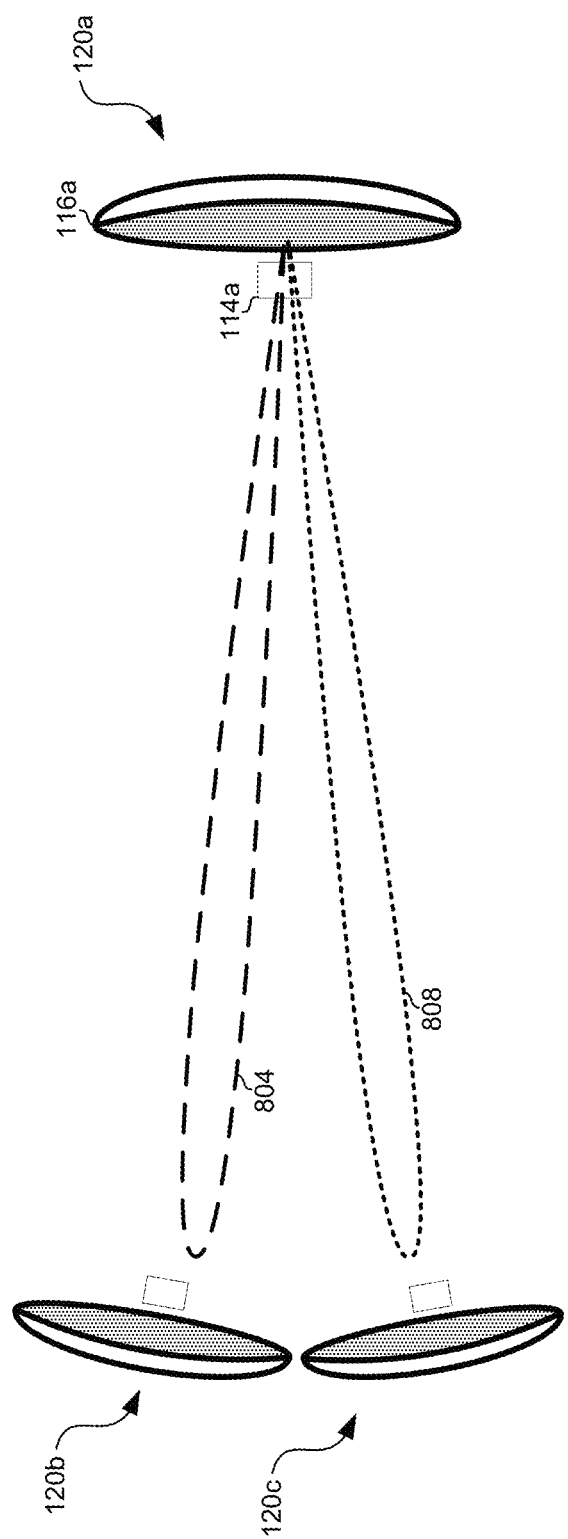
FIG. 8 shows a microwave backhaul assembly configured for two concurrent backhaul links in two different directions.

Referring now to FIG. 5A, there is shown a configuration of the circuit 232 for concurrent reception of two microwave backhaul signals. For example, the signals $403_1$-$403_4$ may be four versions (corresponding to four antenna elements) of a first signal having a first polarization (e.g., horizontal) and feed lines $403_5$-$403_8$ may be four versions of a second signal having a second polarization (e.g., vertical). The first and second signals may be on the same or different frequencies. The signals $403_1$-$403_4$ are each weighted by a respective amplitude coefficient and then the weighted signals are summed resulting in signal 504, which corresponds to the signal received based on the radiation pattern achieved by the phase and amplitude coefficients applied to the signals $403_1$-$403_4$. Similarly, the signals $403_5$-$403_8$ are each weighted by a respective amplitude coefficient and then the weighted signals are summed resulting in signal 506, which corresponds to the signal received based on the radiation pattern achieved by the phase and amplitude coefficients applied to the signals $403_5$-$403_8$. The circuit 508 then combines (e.g., using time and/or frequency division multiplexing) the signals 504 and 506 to generate the signal 405. Where the two signals are received from two different link partners, the phase and amplitude coefficients for signals $403_1$-$403_4$ may be set to achieve a radiation pattern having a lobe (e.g., 804 of FIG. 8) pointing at the first link partner and the phase and amplitude coefficients for signals $403_5$-$403_8$ may be set to achieve a radiation pattern having a lobe (e.g., 808 of FIG. 8) pointing at the second link partner.

Figure 5B:
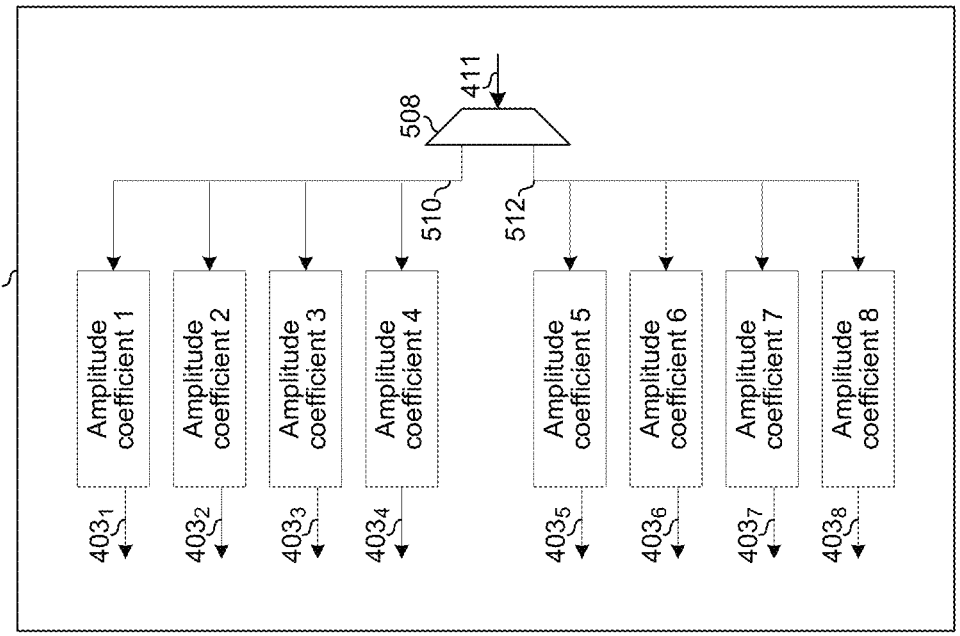
FIGS. 5A-5C show example configurations of the beamforming circuitry of FIG. 4A.
Figure 5A:
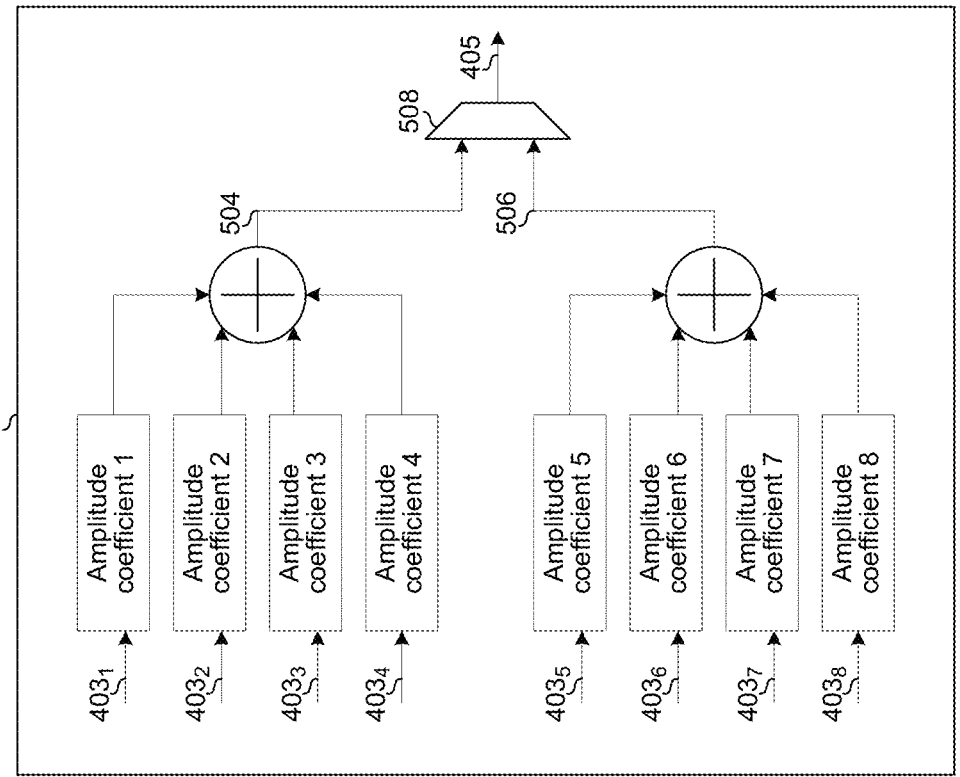

Now referring now to FIG. 5B, there is shown a configuration of the circuit 232 for concurrent transmission of two microwave backhaul signals. For example, the signals $403_1$-$403_4$ may be four versions of a first signal to be transmitted with a first polarization (e.g., horizontal) and signals $403_5$-$403_8$ may be four versions of a second signal to be transmitted with a second polarization (e.g., vertical). The first and second signals may be on the same or different frequencies. The signal 411 carries two baseband signals which are split, by circuit 508, into first signal 510 and second signal 512. Four amplitude coefficients are applied to signal 510 to generate signals $403_1$-$403_4$. The signals $403_1$-$403_4$ are output, respectively, to front-ends $402_1$-$402_4$ where respective phase coefficients are applied before outputting the signals to the antenna elements $306_1$-$306_4$ via feed lines $304_1$-$304_4$. Similarly, four amplitude coefficients are applied to signal 512 to generate signals $403_5$-$403_8$. The signals $403_5$-$403_8$ are output, respectively, to front-ends $402_5$-$402_8$ where respective phase coefficients are applied during upconversion before the signals are output to the antenna elements $306_1$-$306_4$ via feed lines $304_5$-$304_8$. Where the two signals are destined for two different link partners, the phase and amplitude coefficients for signals $403_1$-$403_4$ may be set to achieve a radiation pattern having a lobe (e.g., 804 of FIG. 8) pointing at the first link partner and the phase and amplitude coefficients for signals $403_5$-$403_8$ may be set to achieve a radiation pattern having a lobe (e.g., 808 of FIG. 8) pointing at the second link partner.

Figure 5C:
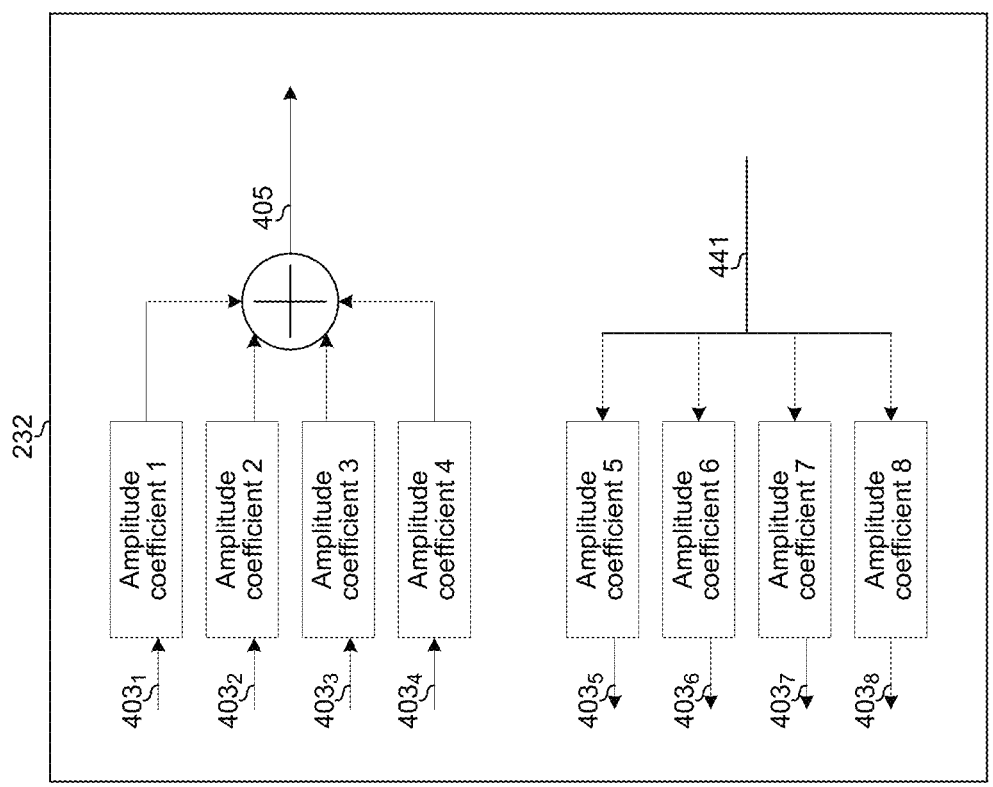

Now referring now to FIG. 5C, there is shown a configuration of the circuit 232 for concurrent transmission of a first microwave backhaul signal and reception of a second microwave backhaul signal. The first signal is received on a first polarization via feed lines $304_1$-$304_4$, application of phase coefficients for the desired radiation pattern are applied in front-ends $402_1$-$402_4$, resulting in signals $403_1$-$403_4$. Amplitude coefficients for the desired radiation pattern are applied to signals $403_1$-$403_4$ in circuit 232, and finally the phase and amplitude weighted signals are combined to generate signal 405. The second signal arrives at circuit 232 as signal 441. The amplitude coefficients are applied resulting in signals $403_5$-$403_8$ which are output to front-ends $402_5$-$402_8$ where phase coefficients are applied during upconversion before the signals are output to feed lines $304_5$-$304_8$ for transmission on the second polarization. Where the first signals is received from a first link partner but the second signals is destined for a second link partners, the phase and amplitude coefficients for signals $403_1$-$403_4$ may be set to achieve a radiation pattern having a lobe (e.g., 804 of FIG. 8) pointing at the first link partner and the phase and amplitude coefficients for signals $403_5$-$403_8$ may be set to achieve a radiation pattern having a lobe (e.g., 808 of FIG. 8) pointing at the second link partner.

Figure 6B:
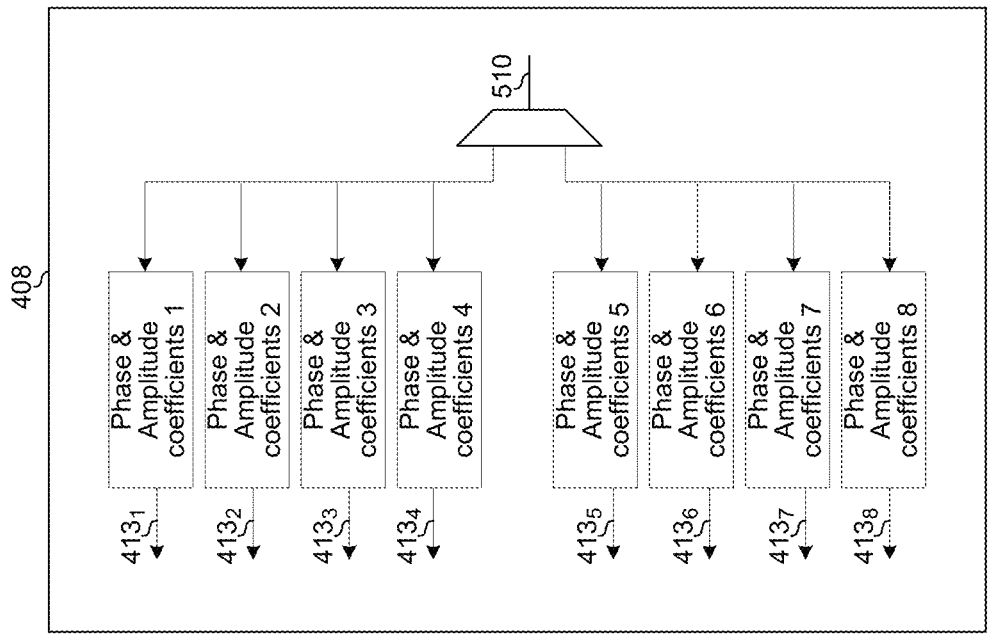
FIGS. 6A-6C show example configurations of beamforming components of the digital signal processing circuitry of FIG. 4B.
Figure 6A:
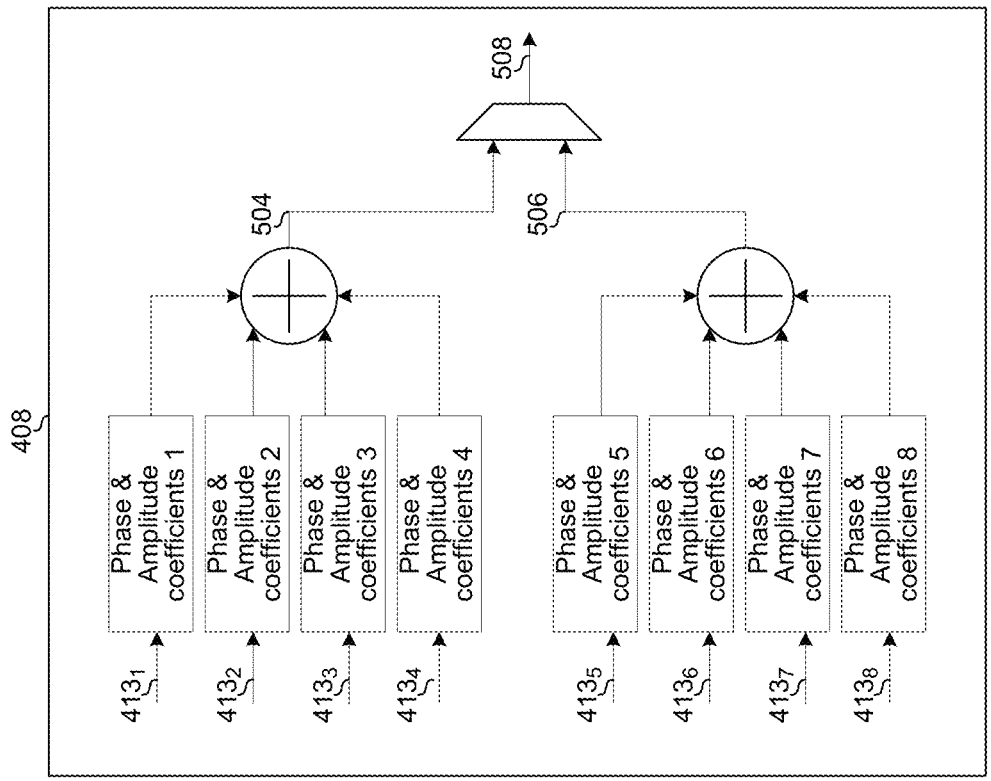
Figure 6C:
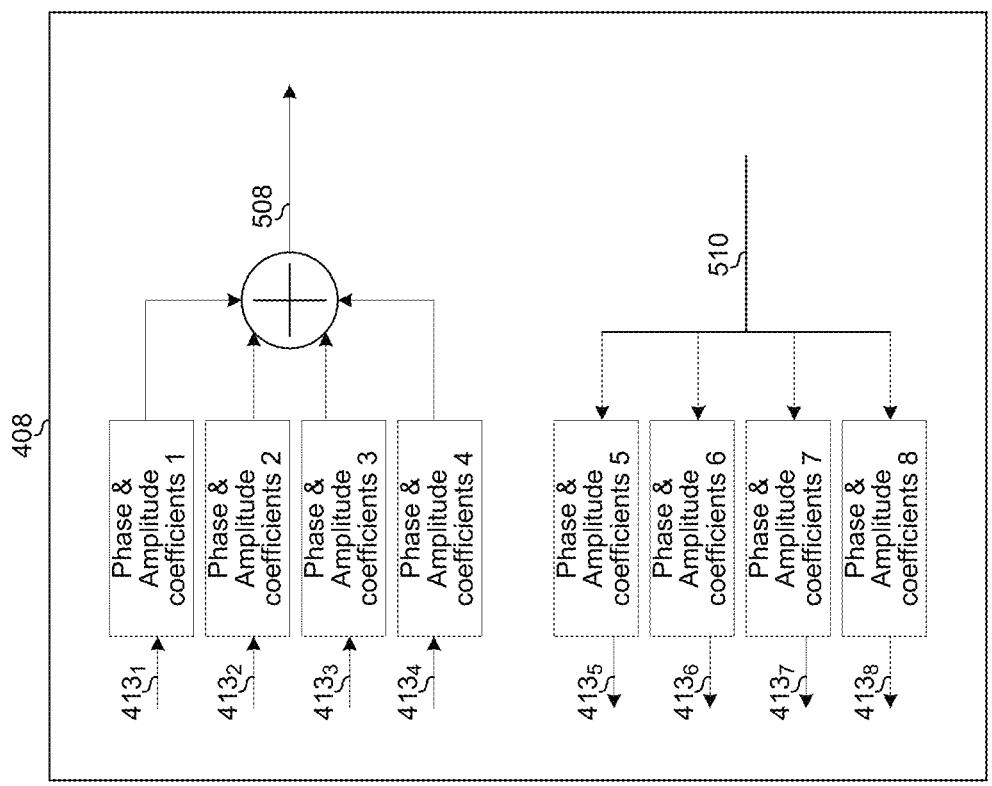

Now referring to FIGS. 6A-6C, shown are three configurations of beamforming circuitry of the digital circuitry 408 of FIG. 4B. The configurations in FIGS. 6A-6C are similar to the respective configurations of circuitry 232 shown in FIGS. 5A-5C. A difference in FIGS. 6A-6C is that the phase and amplitude coefficients are both applied in circuit 408, as opposed to the phase coefficient being applied in the front-ends 402. Another difference is that the phase and amplitude coefficients are applied in the digital domain as opposed to in the analog domain in FIGS. 5A-5C.

Figure 7A:
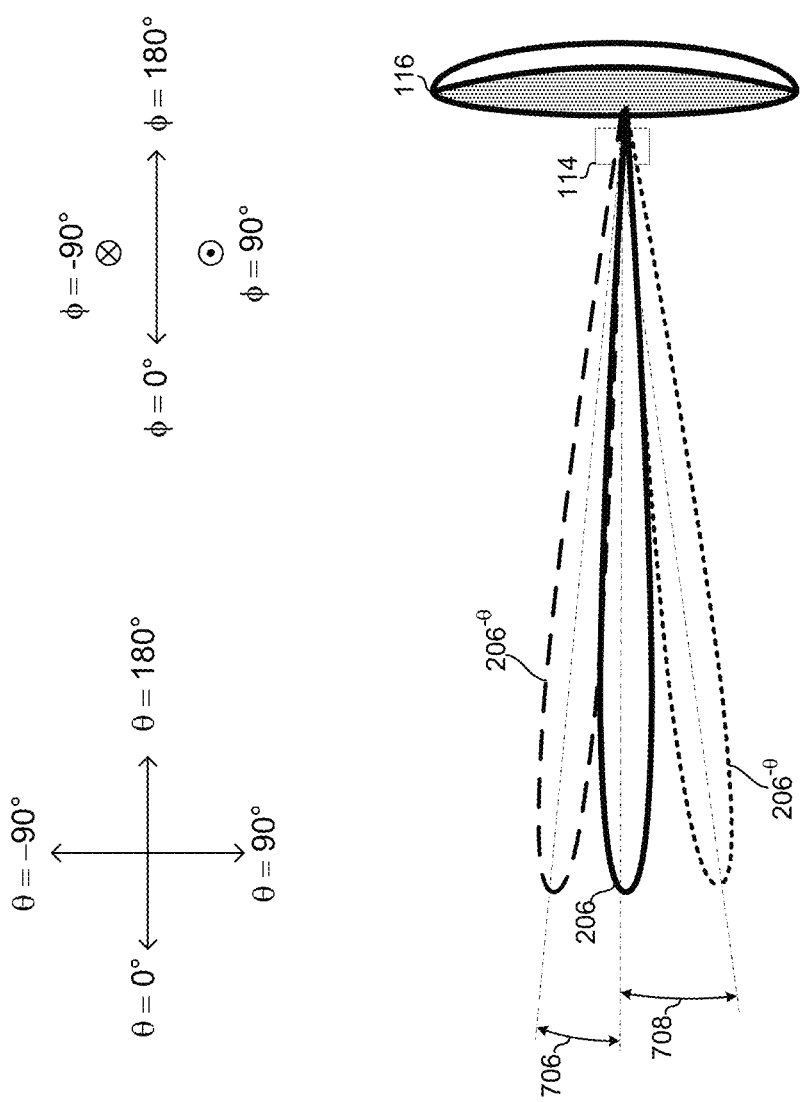
FIG. 7A shows adjustment of an azimuth angle of a lobe of a radiation pattern of a microwave backhaul assembly.

As discussed above, the radiation pattern of the antenna array 202 may be dynamically adjusted. FIG. 7A shows adjustment of the azimuth angle (labeled θ) of the lobe 206. Shown are three positions of the lobe 206 corresponding to three sets of phase and/or amplitude coefficients. The first set of coefficients corresponding to the lobe 206 having θ=0°, the second set of coefficients corresponding to the lobe $206^{-\theta}$ which is shifted in the −θ direction by an amount 706, and the third set of coefficients corresponding to the lobe 200 which is shifted in the +θ direction by an amount 708. FIG. 7B shows adjustment of the elevation angle (labeled φ) of the lobe 206. Shown are three positions of the lobe 206 corresponding to three sets of phase and/or amplitude coefficients. The first set of coefficients corresponding to the lobe 206 having φ=0°, the second set of coefficients corresponding to the lobe $206^{+\phi}$ which is shifted in the +φ direction by an amount 710, and the third set of coefficients corresponding to the lobe $206^{-\phi}$ which is shifted in the −φ direction by an amount 608.

In accordance with an example implementation of this disclosure, a first microwave backhaul transceiver (e.g., 120a) may comprise a reflector (e.g., 116a) and a signal processing subassembly (e.g., 114a). The signal processing subassembly may comprise a plurality of antenna elements (e.g., 306) positioned at a focal plane of the reflector. The signal processing subassembly may process a plurality of microwave signals (e.g., on two or more of feed lines $304_1$-$304_8$) corresponding to the plurality of antenna elements using a corresponding plurality of phase coefficients and a corresponding plurality of amplitude coefficients. The signal processing subassembly may adjust a radiation pattern of the plurality of antenna elements during operation of the signal processing subassembly through adjustment of the phase coefficients and/or the amplitude coefficients. The circuitry may comprise a local oscillator generator (e.g., 228) and a plurality of phase shifters (e.g., $430_1$-$430_8$). Each of the plurality of phase shifters may be configured by a respective one of the plurality of phase coefficients. An output of the local oscillator generator is coupled to an input of each of the plurality of phase shifters. An output of each of the phase shifters may be coupled to a respective one of a plurality of mixers (e.g., 424) be operable to downconvert a respective one of the microwave signals, resulting in a plurality of phase-shifted downconverted signals (e.g., signals $403_1$-$403_8$). The circuitry may comprise a combiner (e.g., 432 or circuitry of digital circuitry 408) which is operable to generate a weighted sum of the plurality of phase-shifted downconverted signals, wherein weights used for the weighted sum are the amplitude coefficients. The circuitry may comprise a plurality of analog front-ends (e.g., $402_1$-$402_8$) operable to downconvert the plurality of microwave signals (e.g., on lines $304_1$-$304_8$) to generate a plurality of downconverted signals (e.g., $403_1$-$403_8$). The circuitry may comprise a plurality of analog-to-digital converters (e.g., $450_1$-$450_8$), each of which is operable to digitize a respective one of the plurality of downconverted signals. The circuitry may be operable to apply the plurality of phase coefficients and the plurality of amplitude coefficients to the plurality of downconverted signals.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
    a first microwave backhaul transceiver comprising:
        a reflector, and
        a signal processing subassembly operable to:
            process a plurality of microwave signals corresponding to said plurality of antenna elements using a corresponding plurality of phase coefficients and a corresponding plurality of amplitude coefficients; and
            adjust a radiation pattern of said plurality of antenna elements during operation of said signal processing subassembly through adjustment of said phase coefficients and/or said amplitude coefficients,
        wherein said signal processing subassembly comprises:
            a plurality of antenna elements positioned at a focal plane of said reflector, and
            circuitry that comprises:
                a local oscillator generator, and
                a plurality of phase shifters, each of said plurality of phase shifters being operably coupled to an output of the local oscillator generator, each of said plurality of phase shifters being configured by a respective one of said plurality of phase coefficients.

2. The system of claim 1, wherein:
    an output of each of said phase shifters is coupled to a respective one of a plurality of mixers operable to downconvert a respective one of said plurality of microwave signals; and
    outputs of said plurality of mixers are a plurality of phase-shifted downconverted signals.

3. The system of claim 2, wherein said circuitry comprises a combiner which is operable to generate a weighted sum of said plurality of phase-shifted downconverted signals, wherein weights used for said weighted sum are said amplitude coefficients.

4. The system of claim 1, wherein:
    said circuitry comprises a plurality of analog front-ends operable to downconvert said plurality of microwave signals to generate a plurality of downconverted signals;
    said circuitry comprises a plurality of analog-to-digital converters, each of which is operable to digitize a respective one of said plurality of downconverted signals;
    said circuitry is operable to apply said plurality of phase coefficients and said plurality of amplitude coefficients to said plurality of downconverted signals.

5. The system of claim 1, wherein:
    said circuitry comprises one or more sensors operable to detect orientation of said first microwave backhaul transceiver; and
    said circuitry is operable to perform said adjustment of said phase coefficients and/or said amplitude coefficients based on said orientation.

6. The system of claim 1, wherein:
    said circuitry comprises one or more sensors operable to detect geographic location of said first microwave backhaul transceiver; and
    said circuitry is operable to perform said adjustment of said phase coefficients and/or said amplitude coefficients based on said geographic location.

7. The system of claim 1, wherein:
said circuitry is operable to determine a performance metric for a microwave backhaul link between said first microwave backhaul transceiver and a second microwave backhaul transceiver; and
said circuitry is operable to perform said adjustment of said phase coefficients and/or said amplitude coefficients based on said performance metric.

8. The system of claim 1, wherein:
said circuitry is operable to determine atmospheric conditions between said first microwave backhaul transceiver and one or more second microwave backhaul assemblies; and
said circuitry is operable to perform said adjustment of said phase coefficients and/or said amplitude coefficients based on said atmospheric conditions.

9. The system of claim 1, wherein said radiation pattern has multiple lobes pointed in multiple directions for concurrently supporting multiple microwave backhaul links in said multiple directions.

10. A method comprising:
in a first microwave backhaul transceiver comprising a reflector and a signal processing subassembly, wherein said signal processing subassembly comprises a plurality of antenna elements positioned at a focal plane of said reflector:
  processing a plurality of microwave signals corresponding to said plurality of antenna elements using a corresponding plurality of phase coefficients and a corresponding plurality of amplitude coefficients;
  configuring a plurality of phase shifters of microwave backhaul transceiver based said plurality of phase coefficients;
  generating a local oscillator signal;
  processing said local oscillator signal via said plurality of phase shifters to generate a plurality of phase-shifted local oscillator signals; and
  adjusting a radiation pattern of said plurality of antenna elements during operation of said signal processing subassembly by adjusting said phase coefficients and/or said amplitude coefficients.

11. The method of claim 10, comprising:
downconverting said plurality of microwave signals via a plurality of mixers having their local oscillator inputs coupled to said plurality of phase-shifted local oscillator signals, said downconverting resulting in a plurality of phase-shifted downconverted signals.

12. The method of claim 11, comprising:
weighting said plurality of phase-shifted downconverted signals with said plurality of amplitude coefficients, said weighting resulting in amplitude scaled and phase shifted downconverted signals; and
combining said amplitude-scaled and phase-shifted downconverted signals.

13. The method of claim 10, comprising:
downconverting said plurality of microwave signals in a corresponding plurality of analog front-ends, said downconverting resulting in a plurality of downconverted signals;
digitizing said plurality of downconverted signals;
phase shifting said plurality of downconverted signals based on said plurality of phase coefficients; and
scaling an amplitude of said plurality of downconverted signals based on said plurality of amplitude coefficients.

14. The method of claim 10, comprising:
detecting orientation of said first microwave backhaul transceiver via one or more sensors installed with said first microwave backhaul transceiver; and
adjusting said phase coefficients and/or said amplitude coefficients based on said orientation.

15. The method of claim 10, comprising:
detecting geographic location of said first microwave backhaul transceiver via one or more sensors installed with said first microwave backhaul transceiver; and
adjusting said phase coefficients and/or said amplitude coefficients based on said detected geographic location.

16. The method of claim 10, comprising:
determining a performance metric for a microwave backhaul link between said first microwave backhaul transceiver and a second microwave backhaul transceiver; and
adjusting said phase coefficients and/or said amplitude coefficients based on said performance metric.

17. The method of claim 10, comprising:
determining atmospheric conditions between said first microwave backhaul transceiver and one or more second microwave backhaul transceivers; and
adjusting of said phase coefficients and/or said amplitude coefficients based on said atmospheric conditions.

18. The method of claim 10, wherein said radiation pattern has multiple lobes pointed in multiple directions for concurrently supporting multiple microwave backhaul links in said multiple directions.

* * * * *